United States Patent [19]  [11] 4,223,947
Cremer  [45] Sep. 23, 1980

[54] HINGE FITTINGS FOR VEHICLE SEATS

[75] Inventor: Heinz P. Cremer, Remscheid, Fed. Rep. of Germany

[73] Assignee: Keiper Automobiltechnik GmbH & Co. KG, Remscheid, Fed. Rep. of Germany

[21] Appl. No.: 967,623

[22] Filed: Dec. 8, 1978

Related U.S. Application Data

[63] Continuation of Ser. No. 905,358, May 12, 1978, abandoned.

[51] Int. Cl.² ............................................. A47C 1/025
[52] U.S. Cl. ........................... 297/367; 16/146; 74/567
[58] Field of Search .................. 16/146, 147, 138–141, 16/144; 74/567, 568, 575, 576, 577 R; 297/366–368, 379

[56] References Cited

U.S. PATENT DOCUMENTS

| 2,153,998 | 4/1939 | Vanderber et al. ............... 74/567 X |
| 3,315,298 | 4/1967 | Strien et al. ............................. 16/146 |
| 3,432,881 | 3/1969 | Putsch et al. ........................... 16/146 |
| 3,479,088 | 11/1969 | Bonnard .......................... 297/366 X |
| 3,608,128 | 9/1971 | Faust ....................................... 16/146 |
| 3,833,965 | 9/1974 | Hess ........................................ 16/146 |
| 3,902,757 | 9/1975 | Yoshimura .......................... 16/146 X |
| 3,966,253 | 6/1976 | Berghof et al. ....................... 297/367 |
| 3,973,288 | 8/1976 | Pickles .................................... 16/146 |
| 3,999,247 | 12/1976 | Cremer .................................. 16/146 |
| 4,085,969 | 4/1978 | Nakane et al. ..................... 16/146 X |

FOREIGN PATENT DOCUMENTS 1342371 1/1974 United Kingdom .................... 297/366

Primary Examiner—William E. Lyddane

[57] ABSTRACT

Hinge fittings such as disclosed in U.S. Pat. No. 3,999,247 for a vehicle seat having an adjustably tiltable backrest member including pivotally connected hinge members one of which has a toothed sector engaged by a toothed pawl pivotally mounted on the other and held in locked engagement by a cam also pivotally mounted on the other hinge member. The cam has a limited pawl engagement face having an intermediate operative range when all lost motion is taken up with the teeth in full locking interengagement covering the extremities of all tolerance possibilities of the interengaging elements and with irreversible self-locking action against cam disengagement under any vibratory or backrest pivotal tilting pressure in either direction.

3 Claims, 6 Drawing Figures

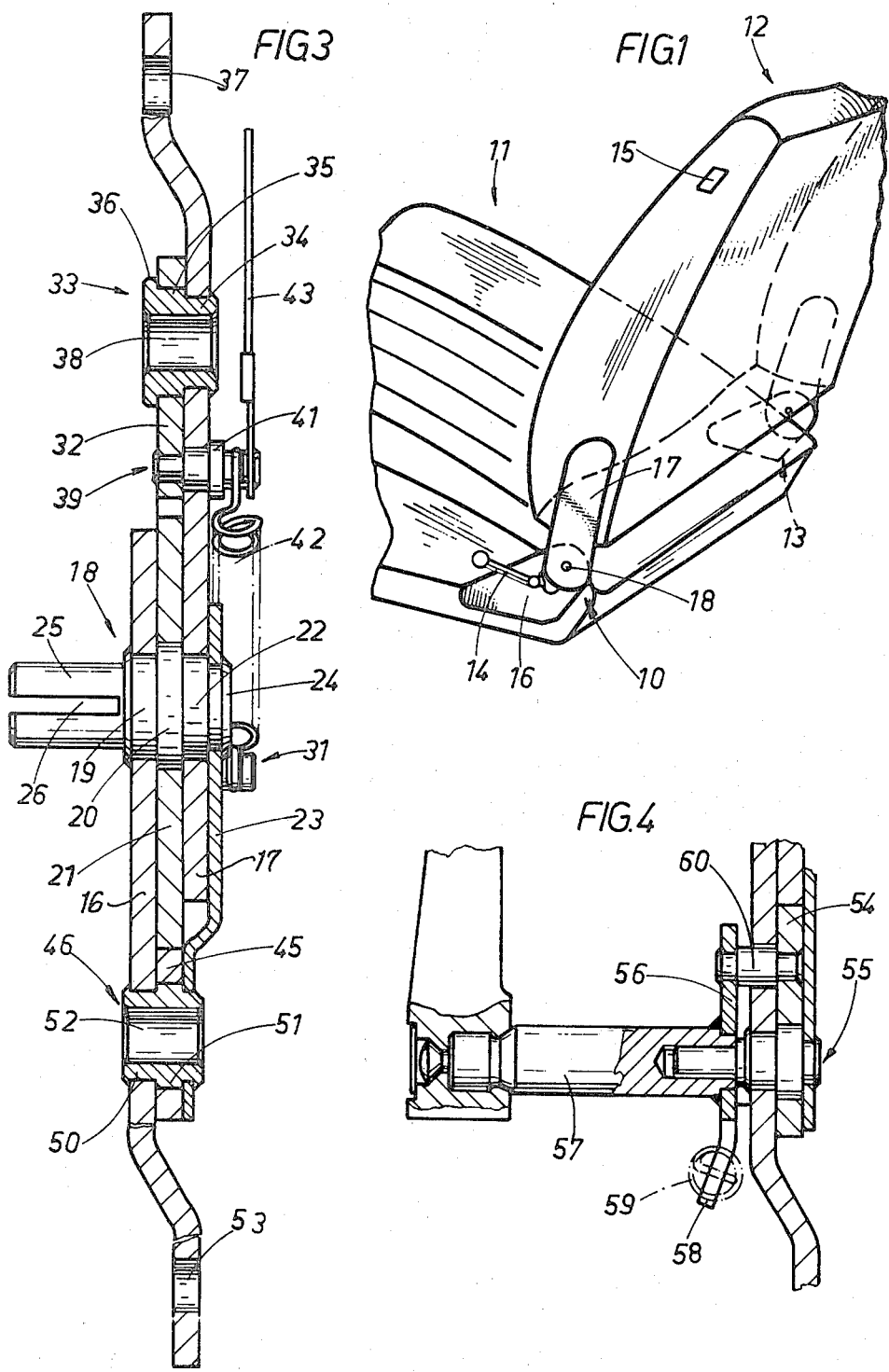

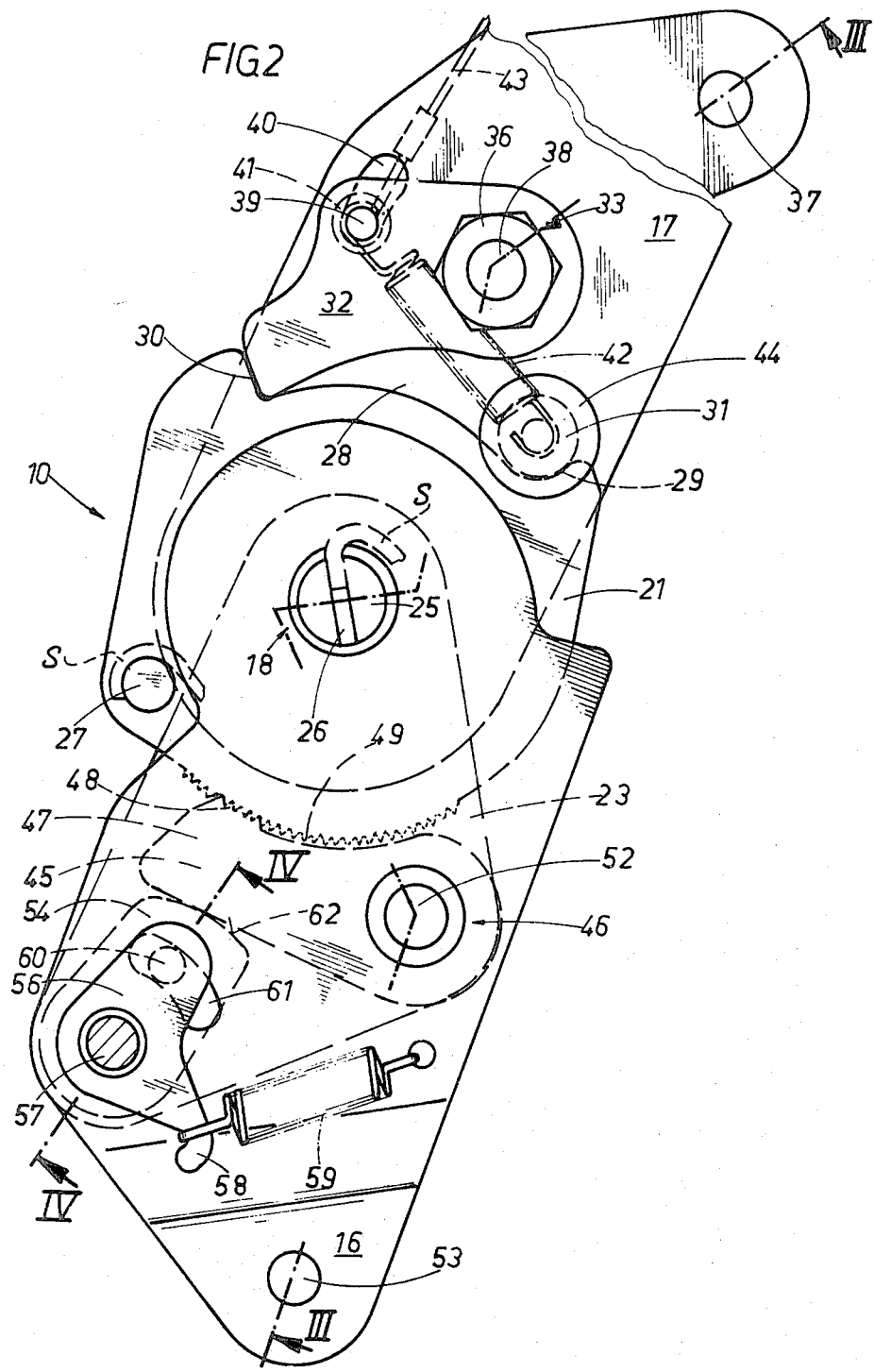

HINGE FITTINGS FOR VEHICLE SEATS

This is a continuation of application Ser. No. 905,358, filed May 12, 1978 now abandoned.

BACKGROUND OF THE INVENTION

The present invention relates to vehicle seat fittings of the type disclosed in my prior U.S. Pat. No. 3,999,247 and more particularly to such fittings manufactured in a manner which will assure effective irreversible locking engagement of the respective pivotally connected hinge elements in any adjusted position throughout the entire range of adjustment and tolerance extremities of the individual elements in assembled relation without resort to a positive stop for the locking cam and without any possibility of looseness between the interposed elements in the locked position, either as initially adjusted or under conditions of vibration and/or backrest loading in either direction; also which will permit the locking cam to be manually retracted easily for seat back adjustment.

The interengaging teeth of the respective sector and pawl elements employed to arrest relative movement between the seat and its backrest with the fitting installed include tooth angles producing a disengaging force on the pawl in response to pressure on the backrest in either direction and life tests for the fitting required by manufacturers for acceptance include dynamic reverse loading for many thousands of cycles which will effectively destroy the fitting if any looseness between the elements prevails; or may gradually produce an unacceptable disengagement if the moment of the disengaging forces effective on the cam are greater than the frictional resistance forces for retaining the cam against disengagement.

SUMMARY OF THE INVENTION

The present fittings comprehend manufacturing the locking cam with a limited arcuate pawl engagement face having a progressive rise relative to the pivotal axis of the cam such that upon full interengagement of the respective sector teeth on the backrest hinge member and teeth of the pawl pivotally mounted on the seat hinge member with all clearance taken up an engagement contact will occur between the pawl and cam intermediate the operative range of the cam face when all interposed elements are manufactured to the mean of their tolerances, manufacturing a dimensional interrelationship for the elements to produce an operative range of the cam at the extremities of tolerances to extend on either side of the mean engagement contact for a limited intermediate range of the cam and engagement face, and manufacturing a dimensional inner-relationship for the elements wherein the unlocking moment resulting from disengaging pressure on the pawl is never throughout the operative range of adjustment greater than the resisting moment effected by frictional resistance operating on a moment arm equal to the radius of curvature of the cam face.

The fittings as so manufactured not only assure an operative construction under all tolerance variations in the component elements but also provide a means for optimizing the manufacturing and operational characteristics of the fitting for example with regard to ease of disengagement and adjustment under all tolerance variations, maximizing tolerances with regard to economy of manufacture, as well as meeting all performance and durability requirements.

BRIEF DESCRIPTION OF THE DRAWINGS

FIG. 1 is a perspective view illustrating a vehicle seat provided with the hinge fitting of the invention;

FIG. 2 is a side view illustrating the hinge fitting in detail;

FIG. 3 is a section on line III—III of FIG. 2;

FIG. 4 is a section on line IV—IV of FIG. 2;

DESCRIPTION OF THE HINGE FITTING

Figure 5:
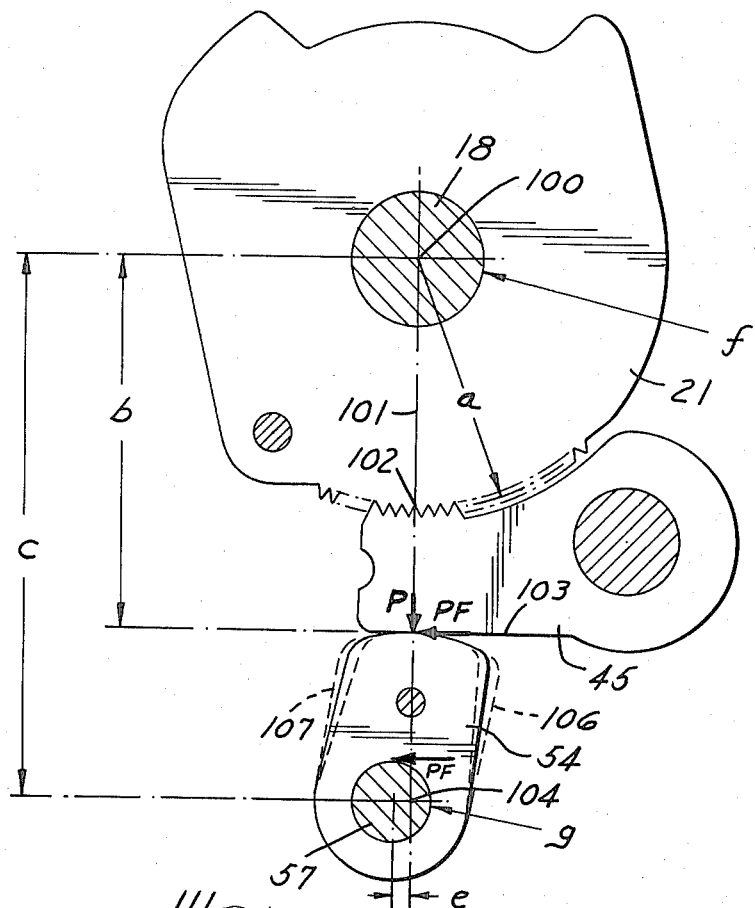
FIG. 5 is a fragmentary view of the critical annular segment, pawl and cam members shown in FIG. 2.

The hinge fittings manufactured in accordance with the present invention is that disclosed in my prior U.S. Pat. No. 3,999,247 from which FIGS. 1-4 of the drawings are reproduced herein and from which the following pertinent portions of the description are also included:

Discussing the drawing in detail and referring firstly to FIG. 1, it will be seen that this Figure shows a seat having a seat member 11 and a backrest member 12. The backrest member 12 is connected with the seat member 11 by means of a hinge fitting 10 according to the present invention so that the backrest member 12 can be tilted to a plurality of inclined positions relative to the seat member 11. The fitting 10 according to the present invention need be provided at only one side of the seat, for example, the left side, whereas a further fitting 13 may be located at the right side and connect the members 11 and 12; this may simply be a pivotable hinge without arresting means. Of course two of the arrestable fittings 10 could also be provided if desired and would then be coupled with one another in a manner that forms no part of the invention so that when one of them is operated to engage or disengage its arresting means, the arresting means of the other fitting would be simultaneously and similarly operated.

The hinge 10 is provided as FIG. 1 shows more clearly, with a handle 14 that must be operated to arrest the seat back member 12 in its selected position relative to the seat member 11, and a further element 15 that must be operated to permit the pivoting of the backrest member 12. Basically, the fitting 10 comprises a fitting member 16 which is fixedly connected with the seat member 11 and a fitting member 17 which is fixedly connected with the backrest member 12. The members 16 and 17 are pivotally connected by means of a pivot pin 18. A portion 19 of the pin 18 is mounted in the member 16 against axial and rotational displacement. A cylindrical portion 20 adjacent the portion 19 carries an annular member 21 that can turn. A stepped portion 22 of the pin 18 rotatably mounts the member 17 which is straddled by a supporting member 23 one end of which is connected to the member 16 and which is also connected to the free end of the pin 18 by means of a rivet 24. FIG. 3 shows that the pin 18 has at the left side a portion 25 formed with a longitudinal slot 26 and serving to retain the inner end of a flat spiral spring S which is prestressed in order to pivot the member 21 relative to the member 16 counterclockwise (in FIG. 2) direction in order to facilitate the selection of the inclination of the seat back member 12. The spiral spring engages with its outer end a projection 27 of the member 21.

As FIG. 2 shows, the upper portion of the circumference of the member 21 is formed with a part circumferentially extending marginal recess 28, the right hand side of which (in FIG. 2) is bounded by a shoulder 29 and the left hand side of which is bounded by an abutment face 30. A pin 31 projects from the member 12 and cooperates with the shoulder 29, and a pawl 32 cooperates with the abutment surface 30. The pawl is turnably mounted on a boss 33 of the member 17. The boss 33 is hollow and of tubular construction having a longitudinal portion 34 that is mounted to the member 17 by riveting a further portion 35 on which the pawl 32 is turnably mounted and a head 36 which advantageously may be of hexagonal outline. The portion 35 is advantageously eccentrically offset relative to the portion 34 i.e. its longitudinal center line is transversely spaced from the longitudinal center line of portion 34, in order to permit, by turning of the boss 33, to obtain an engagement of the pawl 32 with the abutment surface 30 which is almost free of play. In such a construction the tolerances to which the parts in question must be manufactured need not be very precise. The free end portion of the member 17 is formed with a cutout 37 through which a screw is threaded to connect the member 17 to the backrest portion 13. A similar screw extends through the hollow center 38 of the boss 33 into the backrest portion 12.

The pawl 32 is provided with a projection 39 which extends through an arcuately curved cutout 40 of the member 17 and engages with an abutment portion 41 that lateral side of the member 17 that faces away from the pawl 32. A part of the projection 39 which extends beyond the portion 41 is engaged by a motion transmitting element, shown as a helical spring 42 which acts upon the pawl 32 in a sense urging the same into engaging position, furthermore, the same portion of the projection 39 is engaged by a linkage 43 which establishes a connection with the member 15. The spring 42 has its other end connected to the projection 31 which carries a portion 44 (see FIG. 2) that overlaps the edge of the member 21.

A pawl 45 is mounted on the member 16 beneath the member 23, turnable about a tubular boss 46 whose head 47 is formed with a series of teeth 48 which cooperate with teeth 49 formed on the periphery of the member 21 in order to releasably arrest the same in a desired relative angular orientation of the backrest member 12 with reference to the member 16 and hence the seat member 11. The boss 46 has a portion 50 which is riveted to the member 16 and an axially successive portion 51 on which the pawl 45 is turnably mounted. The pawl 45 is retained against axial movement by the presence of the member 23 which is connected with the free end of the boss 46 by riveting. The center passage of the boss 46 is identified with reference number 52 and again a screw or the like extends through the passage 52 to connect the member 16 to the seat portion 11. A further screw rivet or the like extends through a cutout 53 in the member 16 and also into the seat portion 11.

A cam 54 holds the pawl 45 in the operative position; the cam 54 is mounted on an end portion of a pin 55 which extends through the member 16 and the member 23; the other end portion of the pin 55 turnably journals a shaft 57 which couples the member 14 with a member 56, a portion 58 of which serves to support a spring 59 the other end of which is connected to the member 16. Further, the member 56 is provided with a pin 60 which extends through an arcuately curved cutout 61 in the member 16 which extends circumferentially of the pin 55 and engages the cam 54. The pin 60 couples the member 56 nonrotatably with the cam 54. The latter is formed with an eccentrically curved contact face 62 that is eccentric relative to the axis of rotation and serves to hold the pawl 45 in engaged position.

When the member 14 is turned in clockwise direction in FIG. 1, the pawl 45 is moved against the tension of the spring 59 to a release position in which the pawl 45 moves out of engagement so that the backrest portion 12 with the member 21 that is coupled to it via the pin 31 and the pawl 32 can be pivoted to a selected angular position relative to member 16. The flat spiral spring S permits the backrest portion to follow the pressure exerted by the back of a user who is seated on the seat portion 11. The member 15 is used to disengage the pawl via the pin 39, so that the backrest portion 12 can be tilted in counterclockwise direction with the member 17. After the backrest portion 12 has been moved upright again, the pawl 32 is automatically urged by the spring 42 into the arresting position shown in FIG. 2, in which it arrests the member 17 and the backrest member 12 relative to the member 21, which in turn has the previously selected angular position relative to the member 16.

PREFERRED MANUFACTURING METHOD

With reference to FIG. 5 the critical elements which determine the operative adjustment position and pivotally locked relationship of the respective main hinge members 16 and 17 shown in FIG. 2 comprise the annular element 21, pawl 45 and cam 54 all having relative pivot positions fixed on hinge member 16. The critical dimensions which determine the swing of the cam 54 with the segment and pawl teeth fully engaged and all clearance taken up are shown with reference to the center 100 of the hinge pivot and a line 101 passing through the pivot center 100, the center line 102 of the center pawl tooth, such line extending normal to the pawl cam engagement surface 103 and passing through the center 104 of the circular arcuate cam face 105. Such critical dimensions include the common pitch radius "a" of the segment and pawl teeth; the distance "b" from the center of the hinge pivot to the cam engagement face of the pawl; the distance "c" from the center of the hinge pivot to the center of the cam pivot; the radius "d" of the cam face; the offset eccentricity "e" of the cam pivot center to the reference line 101; the clearance "f" between the main hinge pivot pin 18 and mating hole in the member 21; and the clearance "g" between the shaft 57 and the mating hole in the cam 54.

In FIG. 5 the cam 54 is illustrated in full line to represent the nominal manufacturing relationship of the cam relative to the pawl 45 and member 21 and with the dotted lines 106 and 107 representing the extremities of cam swing at the extremities of the tolerances of the respective manufacturing dimensions "a" to "g", thus at the minimum part size and maximum clearance of manufacturing tolerances the cam swing 107 will extend further before a seated position is reached with all clearance taken up, while at the maximum extremity of manufactured part size with minimum clearance the cam swing 106 will be less to reach a seated position relative to the nominal full line position.

In addition to the tolerances of the respective dimensions "a" to "g" the value of the offset eccentricity "e" comprises a major manufacturing consideration not only in establishing the total potential swing between the extremity positions 106 and 107 but also with respect to resisting the displacement of the cam in a clockwise or unlocking direction as a result of pivotal forces applied to the member 21 through tilting the backrest of the seat in either direction tending to disengage the respective teeth of the pawl and segment. Thus, pivotal forces on the member 21 in either direction will tend to disengage the teeth and rotate the pawl 45 in a counterclockwise direction creating a normal force "P" at the cam engaging face 103 which acts on a moment arm equal to the offset eccentricity "e" tending to rotate the cam 54 in a clockwise direction. Such unlocking force is resisted by the frictional force "PF" at the interengaging surfaces of cam and pawl acting on a moment arm equal to the cam face radius "d". Additional frictional force "PF" resisting cam displacement in a clockwise direction occurs from the pressure of the pawl forcing the cam against the pivot shaft 57 acting on a moment arm equal to the radius "r" of shaft 57.

In order for the cam 54 to be secure against the disengaging force of pawl pressure acting on the eccentric offset "e", without undue reliance on the tension of spring 59 which biases the cam towards engaging position, the effective coefficient of friction at the interengaging cam and pawl surfaces times the moment arm "d" plus the effective coefficient of friction of the pivot shaft 57 times the radius of such shaft must be at least as great as the offset eccentricity "e". The effective coefficient of friction will of course depend on the manufactured condition of the interengaging surfaces, the present or absence of any lubrication, and the presence or absence of vibration which may tend to reduce the prevailing static coefficient to a value more nearly approaching that of a sliding coefficient between the same surfaces. It has been found through manufacturing and testing experience where fine blanked steel surfaces are employed the provision of a cam radius "d" 10 times as great as the offset eccentricity "e" provides a conservative approach based on an empirical minimum coefficient value of 0.1 without reliance on cam pivot friction or the tension of spring 59.

Figure 6:
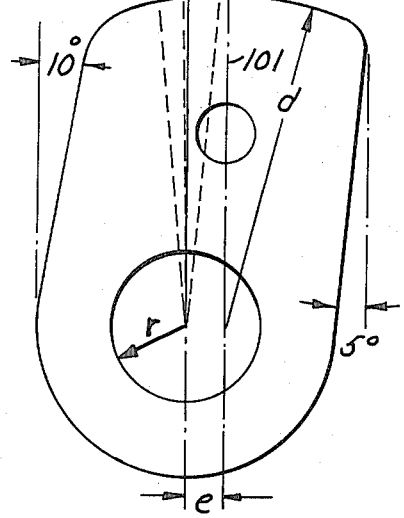
FIG. 6 is an enlarged view of the cam member shown in FIGS. 2 and 5.

As a specific example of dimensional interrelationship including tolerances which have been employed in practicing the manufacturing method disclosed herein, the following table designates each dimension "a", "b", "c", "d" and "e" and shaft to hole clearance "f" and "g" in millimeters at the extremities of its tolerance; and each angle 108, 109 and 110 shown in FIG. 6 as the cam swing respectively from the nominal full line position of the cam 54 shown in FIG. 5 to the dotted line extremity position 107 for minimum part size and maximum clearance, for mean part size and clearance, and the dotted line extremity position 106 for maximum part size and minimum clearance, the respective angles 108, 109 and 110 being shown relative to a reference line 111 parallel to the reference line 101. Mean dimensions in millimeters are also designated.

| | CAM SWING | | |
|---|---|---|---|
| | MAXIMUM | MEAN | MINIMUM |
| a | 44.270 | 44.2825 | 44.295 |
| b | 64.792 | 64.911 | 65.030 |
| c | 95.050 | 95.000 | 94.950 |
| d | 30.100 | 30.150 | 30.200 |
| e | 3.000 | 3.050 | 3.100 |
| f | 0.133 | 0.089 | 0.045 |
| g | 0.129 | 0.0725 | 0.016 |
| 108 | 5°27'52" | | |
| 109 | | 0°12'23" | |
| 110 | | | 4°51'36" |

From the foregoing description of the preferred manufacturing method it will be understood that the rate of cam rise vs pivotal rotation is maximum at the nominal full line position shown in FIG. 5 and diminishes progressively somewhat on either side (At a 90° cam displacement the rate would reach "O"). When using a circular arc for the cam face as shown, care must be taken to not unduly decrease the offset eccentricity "e" relative to tolerance extremities for a number of reasons:

a. Decrease in offset eccentricity will more than proportionally increase necessary cam travel to release pawl and sector teeth engagement for adjustment—possibly to a manually inconvenient degree.

b. With resulting progressive decrease in rate of cam rise, danger of wedging to a difficult release angle, jamming near dead center, or even passing over center to an inoperative position is possible.

c. Economy of manufacture incident to maximizing tolerances, ease of manual release and wear considerations favor increasing offset eccentricity to an extent compatible with assured irreversible locking action.

The method thus involves manufacturing the critical component parts within tolerance ranges compatible with economical interchangeable part size processing, manufacturing a cam rise within a limited operative pivotal range sufficient to satisfy the extremities of all tolerances contributing to potential extent of cam swing for locked engagement, and the manufacture of a cam with a radius-to-offset eccentricity ratio corresponding to the prevailing coefficient of friction at the cam-pawl engagement surfaces.

I claim:

1. Hinge fittings manufactured within production tolerances for vehicle seats having tiltable backrest members, each fitting including a first hinge member connectable to a seat rest member; a second hinge member connectable to a backrest member; pivot means connecting said hinge members for relative pivoting movement; arresting means for arresting said hinge members in selected relative angular positions, said arresting means comprising an annular member with teeth on a circular arcuate peripheral segment thereof rigidly secured to said second hinge member in concentric relation to said pivot means, a pawl having mating teeth on a concave circular arcuate segment for engaging the teeth on said annular member in any adjusted position thereof, a pivotal mounting for said pawl on said first hinge member positioned to accommodate disengagement and full concentric interengagement of the teeth on said respective mating segments for any given adjusted position thereof, said pawl having a cam engageable surface, a cam having a pivotal mounting on said first hinge member in triangularly spaced relation to said first pivot means and pivotal mounting for said pawl, means normally biasing said cam toward interengagement of said teeth in a given adjusted position, means for retracting said cam to accommodate disengagement of said teeth for readjustment of said relative angular position, said teeth having pressure angles subjecting said pawl to pivotal disengagement forces in response to relative pivoting forces between said first and second hinge members in either direction, characterized by said named elements having manufacturing dimensional tolerances establishing an operative range of pivotal cam rise, necessary in assembled relation to take up all clearance with said teeth and cam fully engaged, extending throughout the cumulative extremities of said dimensional tolerances, said cam having a circular arcuate face including said operative range of cam rise within a limited intermediate portion of said cam face, said pawl having a relatively more linear contact force than said cam face, and a line normal to the fully engaged contact between said cam and pawl extending past the pivotal center of said cam in spaced relation thereto a a substantial distance no greater than ten percent (10%) of the distance from said pivotal center to said contact at every possible position throughout said operative range.

2. Hinge fittings for vehicle seats as set forth in claim 1 wherein said cam face is constructed with a circular arc engagement face having its center at a point on said line laterally spaced relative to the pivotal center of said cam.

3. Hinge fittings for vehicle seats as set forth in claim 2 wherein a line between said arc and pivotal centers extends substantially normal to said first named line when said contact is at the center of said operative range.

* * * * *